(12) United States Patent
Maruyama et al.

(10) Patent No.: US 8,561,297 B2
(45) Date of Patent: Oct. 22, 2013

(54) METHOD FOR PRODUCING ENGINE VALVE IN WHICH SODIUM METAL IS SEALED

(75) Inventors: Kazutaka Maruyama, Tokyo (JP); Hirokazu Morii, Tokyo (JP); Hyoji Yoshimura, Nagoya (JP)

(73) Assignees: Mitsubishi Heavy Industries, Ltd., Tokyo (JP); Yoshimura Company, Aichi (JP)

( * ) Notice: Subject to any disclaimer, the term of this patent is extended or adjusted under 35 U.S.C. 154(b) by 0 days.

(21) Appl. No.: 13/637,895

(22) PCT Filed: May 2, 2011

(86) PCT No.: PCT/JP2011/060503
§ 371 (c)(1),
(2), (4) Date: Sep. 27, 2012

(87) PCT Pub. No.: WO2011/142287
PCT Pub. Date: Nov. 17, 2011

(65) Prior Publication Data
US 2013/0019474 A1    Jan. 24, 2013

(30) Foreign Application Priority Data

May 12, 2010 (JP) .................................. 2010-109882

(51) Int. Cl.
*B21K 1/20* (2006.01)
(52) U.S. Cl.
USPC .................. 29/888.45; 123/41.16; 123/188.2; 123/188.3
(58) Field of Classification Search
USPC ............... 29/888.4, 888.45, 888.451, 890.12; 72/349, 256, 352; 123/188.2, 188.3
See application file for complete search history.

(56) References Cited

U.S. PATENT DOCUMENTS

| 2,411,734 | A | * | 11/1946 | Kerwin et al. | ............. | 123/188.1 |
| 2,440,461 | A | * | 4/1948 | Clements | .................. | 29/888.45 |
| 2,471,937 | A | * | 5/1949 | Colwell | .................. | 29/888.451 |
| 2,548,092 | A | * | 4/1951 | Bartlett et al. | ............. | 123/41.16 |
| 2,731,708 | A | * | 1/1956 | Kubera | .................... | 29/888.451 |
| 3,186,209 | A | * | 6/1965 | Friedman | ........................ | 72/334 |

(Continued)

FOREIGN PATENT DOCUMENTS

EP   0911493 A2  *  4/1999
EP   1640086 A1  *  3/2006

(Continued)

*Primary Examiner* — David Bryant
*Assistant Examiner* — Ruth G Hidalgo-Hernandez
(74) *Attorney, Agent, or Firm* — Birch, Stewart, Kolasch & Birch, LLP

(57) ABSTRACT

Provided is a method for producing an engine valve by subjecting a stem portion having a hollow part to a drawing treatment using a series of dies such that the outer diameter and inner diameter of the stem portion become smaller in steps and the stem portion is thereby molded to the desired size, whereby, after the stem portion has been subjected to the drawing treatment until the inner diameter of the hollow part of the stem portion has reached a specific size, sodium metal in the form of a solid block is introduced to the hollow part of the stem portion, and a protective agent made from solid paraffin or naphthalene is also introduced to the hollow part of the stem portion such as to form a barrier between the sodium metal and the atmosphere, after which the stem portion is further subjected to a cold drawing treatment.

3 Claims, 2 Drawing Sheets

(56) References Cited

U.S. PATENT DOCUMENTS

| | | | | |
|---|---|---|---|---|
| 5,054,195 A | * | 10/1991 | Keck et al. | 29/888.453 |
| 5,056,219 A | * | 10/1991 | Iwase | 29/888.451 |
| 5,413,073 A | * | 5/1995 | Larson et al. | 123/188.3 |
| 5,769,037 A | * | 6/1998 | Ohtsubo et al. | 123/41.34 |
| 6,139,660 A | * | 10/2000 | Nagashima et al. | 148/677 |
| 6,161,285 A | * | 12/2000 | Eberhardt et al. | 29/888.451 |
| 2009/0266314 A1 | * | 10/2009 | Uchiyama et al. | 123/41.16 |
| 2011/0174259 A1 | | 7/2011 | Yoshimura | |

FOREIGN PATENT DOCUMENTS

| | | |
|---|---|---|
| JP | 3-18605 A | 1/1991 |
| JP | 3-238139 A | 10/1991 |
| JP | 4-232318 A | 8/1992 |
| JP | 4-272413 A | 9/1992 |
| JP | 2005-48635 A | 2/2005 |
| JP | 2009-185655 A | 8/2009 |
| JP | 4390291 B1 * | 12/2009 |
| JP | 4390291 B1 | 12/2009 |
| WO | WO 2007/057946 A1 | 5/2007 |

* cited by examiner

METHOD FOR PRODUCING ENGINE VALVE IN WHICH SODIUM METAL IS SEALED

TECHNICAL FIELD

The present invention relates to a method for producing an engine valve in which sodium metal is filled.

BACKGROUND ART

To cope with the trend toward higher engine performance, lower fuel consumption, and the like, engine valves of some automobiles and the like are designed such that the engine valves are provided therein with a hollow portion in which sodium metal is filled, so as to achieve lighter weight and higher heat transfer.

In the case of such an engine valve, for example, first, a head portion is formed by forging or the like in a solid round rod-shaped raw material, and a hollow portion is formed by punching or the like inside a portion serving as a stem portion. Then, drawing is sequentially performed by inserting the stem portion sequentially into multiple, differently-sized cylindrical dies so that the outer diameter and inner diameter of the stem portion can be decreased in a stepped manner and the length of the stem portion can be increased in a stepped manner. As a result, a stem portion of a target size is formed (see Patent Literature 1 listed below and the like, for example).

Thereafter, (1) solid sodium metal is molded by extrusion into a rod shape, cut into a predetermined length, and inserted into the hollow portion, or (2) solid sodium metal is heated and melted (about 120 to 300° C.) to a liquid form and injected into the hollow portion in a predetermined quantity. After the sodium metal is thus put into the hollow portion, an opening at the upper end of the stem portion is sealed, whereby an engine valve in which sodium metal is filled is produced (see Patent Literature 2 listed below and the like, for example).

CITATION LIST

Patent Literature

Patent Literature 1: Japanese Patent No. 4390291
Patent Literature 2: Japanese Patent Application Publication No. Hei 3-018605

SUMMARY OF INVENTION

Technical Problems

However, the following problems exist in the conventional methods for producing sodium-metal filled engine valve described above.

(1) Solid sodium metal is hard to mold by extrusion, and thus the workability of the molding is poor.

(2) In the injection of liquid sodium metal into the hollow portion, if adhering to the inner wall of the hollow portion which is narrow (a diameter of about 2 to 4 mm), the sodium metal cools down and solidifies immediately, thereby closing the hollow portion. For this reason, the injection of the liquid sodium metal needs to be performed with the stem portion being heated (to 98° C. or higher), and thus the workability of the injection is poor.

The present invention has been made in view of the above problems, and an object thereof is to provide a method for producing a sodium-metal filled engine valve capable of allowing sodium metal to be easily put into the engine valve.

Solution to Problems

A method for producing an engine valve in which sodium metal is filled according to a first invention to solve the above described problems is a method for producing an engine valve in which sodium metal is filled, the method including: molding a stem portion having a hollow portion therein into a target size by subjecting the stem portion sequentially to a drawing process to decrease an outer diameter and an inner diameter of the stem portion in a stepped manner; and putting the sodium metal into the hollow portion of the stem portion, the method characterized in that the stem portion is molded into the target size by: putting a block-shaped solid sodium metal into the hollow portion of the stem portion and putting a protective agent made of any one of solid paraffin and naphthalene into the hollow portion of the stem portion in such a way as to isolate the sodium metal and an atmosphere from each other; and subjecting the stem portion to a cold-drawing process.

The method for producing a sodium-metal filled engine valve according to a second invention is characterized in that, in the first invention, the stem portion is molded into the target size by: subjecting the stem portion to a drawing process until an inner diameter of the hollow portion of the stem portion reaches a specific size; putting the block-shaped solid sodium metal into the hollow portion of the stem portion and putting the protective agent into the hollow portion of the stem portion; and further subjecting the stem portion to the cold-drawing process.

The method for producing a sodium-metal filled engine valve according to a third invention is characterized in that, in the first invention, the stem portion is molded into the target size by: putting the block-shaped solid sodium metal into the hollow portion of the stem portion and putting the protective agent into the hollow portion of the stem portion before subjecting the stem portion to a drawing process; and then subjecting the stem portion to the cold-drawing process.

Advantageous Effects of Invention

According to the method for producing a sodium-metal filled engine valve according to the present invention, the stem portion is molded into the target size by: putting the sodium metal in the form of a solid block into the hollow portion of the stem portion and putting the protective agent into the hollow portion of the stem portion in such a way as to isolate the sodium metal and an atmosphere from each other; and subjecting the stem portion to the cold-drawing process. Thus, it is possible to put sodium metal into the hollow portion by simply cutting raw material sodium into block-shaped sodium metal of an easy-to-handle size and introducing it into the hollow portion. Accordingly, the sodium metal can be put inside the engine valve V easily. Moreover, the protective agent can securely prevent a reaction of the sodium metal which would otherwise occur by contact of the sodium met al with the atmosphere. Accordingly, the operations in the cold-drawing process of the stem portion can be made easy.

DESCRIPTION OF EMBODIMENTS

Hereinbelow, embodiments of a method for producing a sodium-metal filled engine valve according to the present invention will be described based on the drawings. However, the present invention is not limited only to the following embodiments to be described based on the drawings.

Main Embodiment

A main embodiment of a method for producing a sodium-metal filled engine valve according to the present invention will be described based on FIG. 1.

Figure 1:
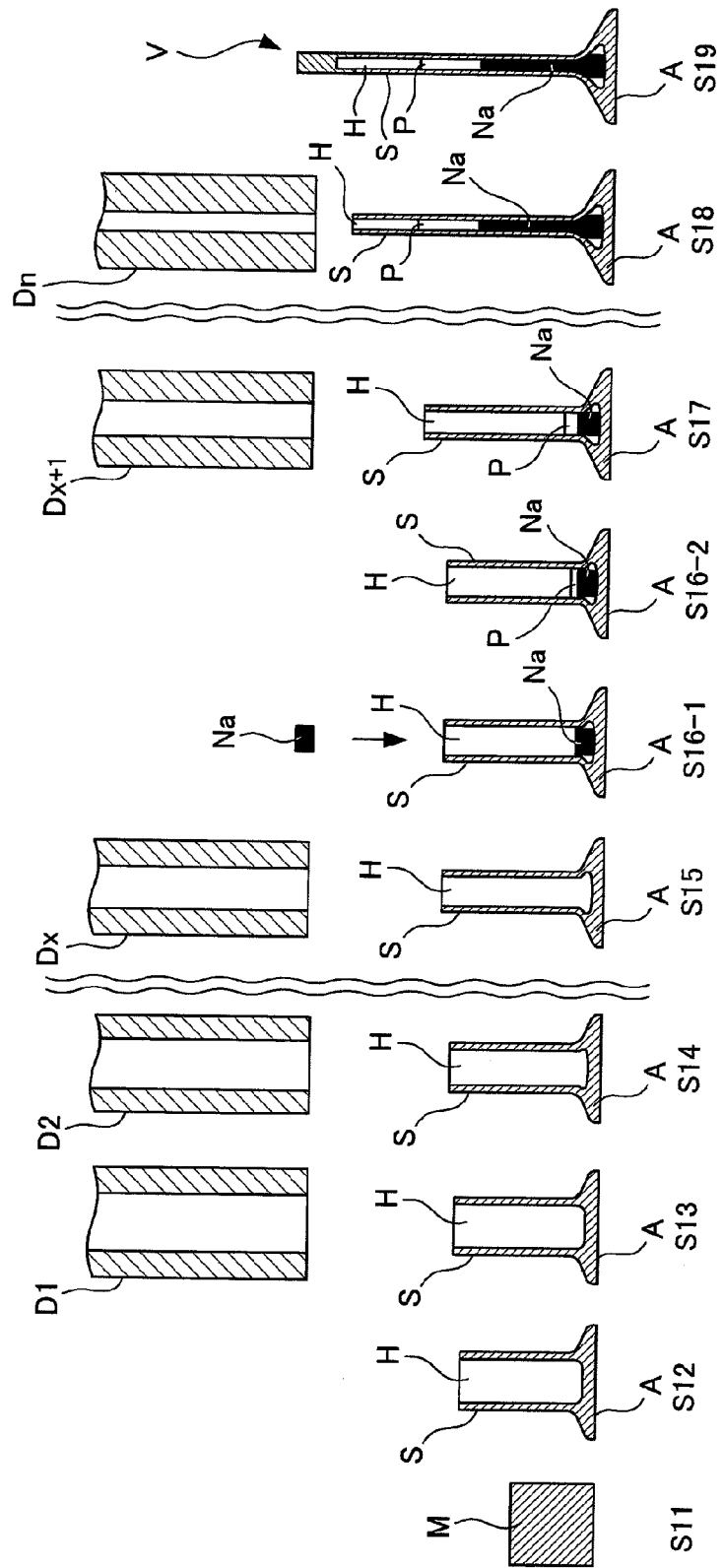
FIG. 1 is a diagram describing a procedure in a main embodiment of a method for producing a sodium-metal filled engine valve according to the present invention.

As shown in FIG. 1, first, a solid round rod-shaped raw material M (having a diameter of about 16 to 20 mm and a length of about 35 to 50 mm, for example) is prepared (step S11). A head portion A is formed by forging or the like, and a hollow portion H (having an inner diameter of 15 to 19 mm, for example) is formed by punching or the like (step S12). Then, a drawing process is performed by inserting a stem portion S (a portion surrounding the hollow portion H) into a cylindrical die D1 having an inner diameter smaller (by about −0.5 to −1.5 mm, for example) than the outer diameter of the stem portion S, to thereby decrease the outer diameter and inner diameter and increase the length (step S13).

Thereafter, another drawing process is performed by inserting the stem portion S again into a cylindrical die D2 smaller in inner diameter (by about −0.5 to −1.5 mm, for example) than the die D1, to thereby further decrease the outer diameter and inner diameter and further increase the length (step S14). Subsequently, by sequentially using multiple, differently-sized dies Dx with inner diameters slightly diminishing as described above (by about 0.5 to 1.5 mm, for example), a drawing process is performed sequentially so that the outer diameter and inner diameter of the stem portion S can be decreased in a stepped manner down to a specific size (an inner diameter of roughly about 4 to 15 mm (preferably about 10 to 15 mm), for example) and the length of the stem portion S can be increased in a stepped manner (step S15).

After the stem portion S is decreased to the specific size by performing the drawing process as described above, a dry inert gas atmosphere (dry nitrogen gas or the like, for example) is set. Then, sodium metal Na in the form of a block obtained by cutting raw material sodium into a predetermined size (a hexahedral block with each side measuring roughly about 3 to 13 mm (preferably 8 to 13 mm), for example) is introduced into the hollow portion H from an opening in an upper portion thereof (step S16-1). In addition, a protective agent P made of solid paraffin or naphthalene is put into the hollow portion H from the opening in the upper portion thereof to isolate and protect the sodium metal Na from the atmosphere (step S16-2).

After introducing the block-shaped sodium metal Na cut to the predetermined size into the hollow portion H and protecting the sodium metal Na with the protective agent P, then a cold-drawing process is performed in the dry inert gas atmosphere (dry nitrogen gas or the like, for example) by inserting the stem portion S into a cylindrical die Dx+1 smaller in inner diameter (by about −0.5 to −1.5 mm, for example) than the die Dx, to thereby further decrease the outer diameter and inner diameter and further increase the length (step S17). In this step, the block-shaped sodium metal Na and the protective agent P introduced in the hollow portion H deform in such a way as to follow the deformation of the hollow portion H over the course of the cold-drawing process.

Subsequently, similarly, by sequentially using multiple, differently-sized dies Dn with slightly diminishing (by about 0.5 to 1.5 mm, for example) inner diameters, cold-drawing process is sequentially performed such that the outer diameter and inner diameter of the stem portion S are decreased in a stepped manner down to target sizes (an outer diameter of about 5 to 7 mm and an inner diameter of about 2 to 4 mm, for example) and the length of the stem portion S is increased in a stepped manner up to a target length (about 55 to 99 mm, for example) (step S18).

After the outer diameter and inner diameter of the stem portion S reach their target sizes and also the length thereof reaches its target length, a getter material such as titanium powder is introduced into the hollow portion H, and then an end portion of the stem portion S is sealed by axial welding (step S19). As a result, there is obtained an engine valve V with the sodium metal Na being filled inside the hollow portion H of the stem portion S.

In sum, the conventional practices utilizes solid sodium metal molded by extrusion into a rod shape or liquid sodium metal heated and melted (about 120 to 300° C.) so that the sodium metal Na can be inserted into a hollow portion H of a stem portion S molded through a drawing process into a target size (an inner diameter of about 2 to 4 mm, for example); on the other hand, in this embodiment, the stem portion S is molded into the target size by: first, subjecting the stem portion S to a drawing process until it reaches the specific size (an inner diameter of roughly about 4 to 15 mm (preferably about 10 to 15 mm), for example) which is larger than the target size; putting the block-shaped solid sodium metal Na (a hexahedral block with each side measuring roughly about 3 to 13 mm (preferably 8 to 13 mm), for example) into the hollow portion H of the stem portion S; putting the protective agent P into the hollow portion H of the stem portion S in such a way that the protective agent P isolates the sodium metal Na and the atmosphere from each other; and further subjecting the stem portion S to a cold-drawing process.

Accordingly, in this embodiment, it is possible to put sodium metal Na into the hollow portion H by simply cutting raw material sodium into block-shaped sodium metal Na of the easy-to-handle size and introducing it from the opening in the upper portion of the hollow portion H.

Hence, according to this embodiment, the sodium metal Na can be put inside the engine valve V easily.

Moreover, since the protective agent P protects the sodium metal Na inside the hollow portion H of the stem portion S, it is possible to securely prevent a reaction of the sodium metal Na which would otherwise occur by contact of the sodium metal Na with the atmosphere (for example, contact with moisture contained in the atmosphere in a very small quantity). Accordingly, the operations in the cold-drawing process of the stem portion S can be made easy.

Other Embodiments

Figure 2:
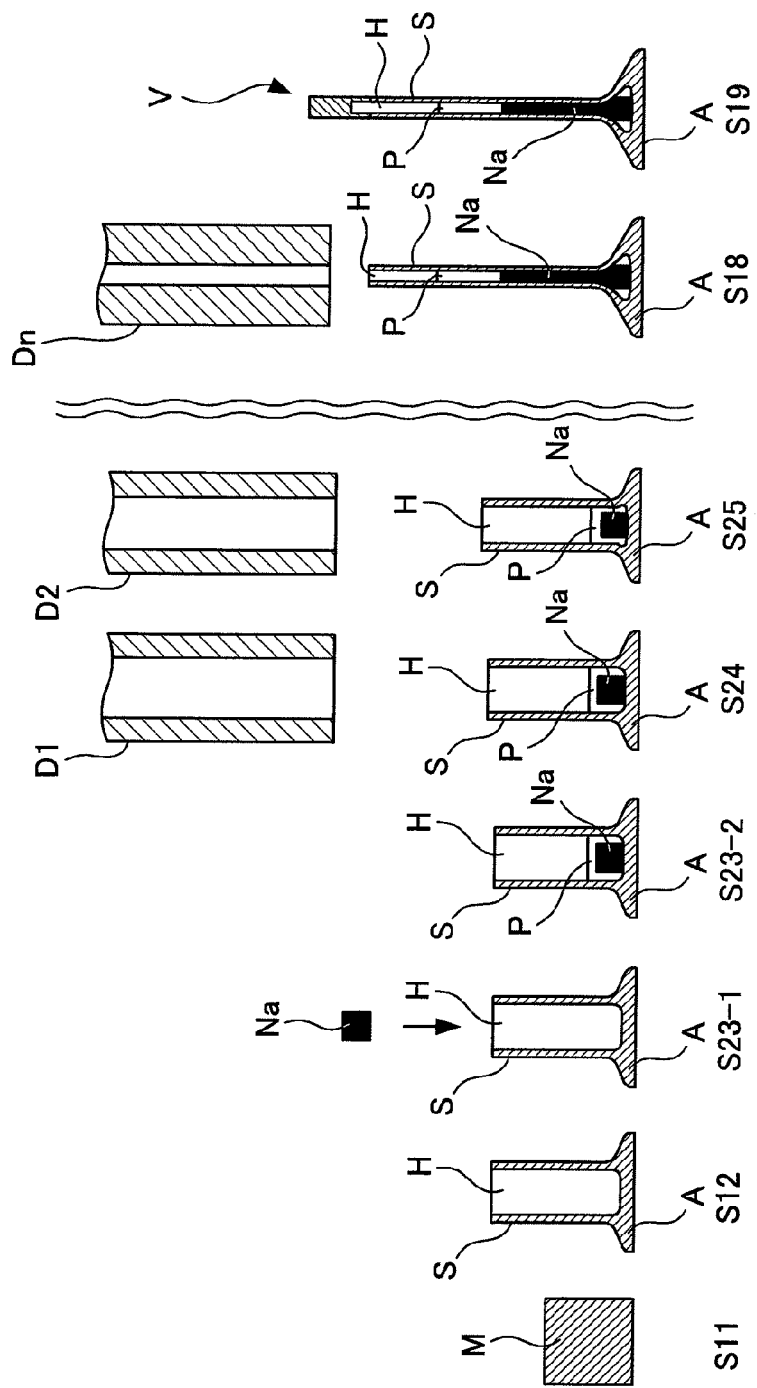
FIG. 2 is a diagram describing a procedure in another embodiment of the method for producing a sodium-metal filled engine valve according to the present invention.

As described earlier, in the foregoing embodiment, the stem portion S is molded into the target size mentioned above by: first, subjecting the stem portion S to a drawing process until it reaches the specific size (an inner diameter of roughly about 4 to 15 mm (preferably about 10 to 15 mm), for example) which is larger than the target size; putting the block-shaped solid sodium metal Na (a hexahedral block with each side measuring roughly about 3 to 13 mm (preferably 8 to 13 mm), for example) into the hollow portion H of the stem portion S; and then further subjecting the stem portion S to a cold-drawing process. However, as another embodiment, as shown in FIG. 2, for example, it is possible to: prepare a raw material M (step S11); form a head portion A by forging or the like and form a hollow portion H by punching or the like (step S12); set a dry inert gas atmosphere (dry nitrogen gas or the like, for example) and introduce sodium metal Na in the form of a block, obtained by cutting raw material sodium into a predetermined size (a hexahedral block with each side measuring roughly about 13 to 17 mm, for example), into the hollow portion H from an opening in an upper portion thereof (step S23-1); put the aforementioned protective agent P into the hollow portion H from the opening in the upper portion thereof in such a way as to isolate the sodium metal Na and the atmosphere from each other (step S23-2); perform a cold-drawing process by inserting the stem portion S into a die D1, to thereby decrease the outer diameter and inner diameter and increase the length (step S24); subsequently, sequentially perform a cold-drawing process in the atmosphere by sequentially using multiple, differently-sized dies D2, Dn, and so on with slightly diminishing inner diameters in the same way as described earlier such that the outer diameter and inner diameter of the stem portion S are decreased in a stepped manner down to the target sizes and the length of the stem portion S is increased in a stepped manner up to the target length (steps S25 and S18); and then seal an end portion of the stem portion S by axial welding (step S19), to thereby obtain an engine valve V with the sodium metal Na being filled inside the hollow portion H of the stem portion S. In other words, it is possible to mold the stem portion S into the target size by putting the block-shaped solid sodium metal Na into the hollow portion H of the stem portion S and putting the protective agent P into the hollow portion H of the stem portion S before subjecting the stem portion S to the drawing process, and then by subjecting the stem portion S to the cold-drawing process.

However, the number of cold-drawing processes performed under the dry inert gas atmosphere can be minimized when the stem portion S is molded into the target size like the foregoing embodiment by: first, subjecting the stem portion S to a drawing process until it reaches the specific size (an inner diameter of about 10 to 15 mm, for example) which is larger than the target size; putting the block-shaped solid sodium metal Na (a hexahedral block with each side measuring roughly about 8 to 13 mm, for example) into the hollow portion H of the stem portion S and putting the protective agent P into the hollow portion H of the stem portion S; and further subjecting the stem portion S to a cold-drawing process. Such minimization makes it possible to suppress the deterioration in operating efficiency and is therefore very preferable.

Moreover, the protective agent P may be put into the hollow portion H in any of the following ways. For example, the protective agent P may be put into the hollow portion by: forming, in advance, the protective agent P into a circular plate shape or a circular column shape in accordance with the diameter of the hollow portion H, and after the sodium metal Na is introduced, putting the protective agent P in such a way as to close and plug a portion of the hollow portion H above the sodium metal Na; or, after the sodium metal Na is introduced, heating and melting the protective agent P, and dripping the protective agent P from the opening on the upper side of the hollow portion H to thereby coat the surface of the sodium metal Na with the protective agent P; or in some other way.

INDUSTRIAL APPLICABILITY

The method for producing a sodium-metal filled engine valve according to the present invention can be utilized industrially remarkably effectively for being capable of allowing sodium metal to be easily put into an engine valve.

REFERENCE SIGNS LIST

V engine valve
A head portion
S stem portion
H hollow portion
D1, D2, Dx, Dx+1, Dn die
Na sodium metal
P protective agent

The invention claimed is:

1. A method for producing an engine valve in which sodium metal is filled, the method including: molding a stem portion having a hollow portion therein into a target size by subjecting the stem portion sequentially to a drawing process to decrease an outer diameter and an inner diameter of the stem portion in a stepped manner; and putting the sodium metal into the hollow portion of the stem portion, the method wherein
the stem portion is molded into the target size by: putting a block-shaped solid sodium metal into the hollow portion of the stem portion and putting a protective agent made of any one of solid paraffin and naphthalene into the hollow portion of the stem portion in such a way as to isolate the sodium metal and an atmosphere from each other; and subjecting the stem portion to a cold-drawing process.

2. The method for producing a sodium-metal filled engine valve according to claim 1, wherein
the stem portion is molded into the target size by: subjecting the stem portion to a drawing process until an inner diameter of the hollow portion of the stem portion reaches a specific size; putting the block-shaped solid sodium metal into the hollow portion of the stem portion and putting the protective agent into the hollow portion of the stem portion; and further subjecting the stem portion to the cold-drawing process.

3. The method for producing a sodium-metal filled engine valve according to claim 1, wherein
the stem portion is molded into the target size by: putting the block-shaped solid sodium metal into the hollow portion of the stem portion and putting the protective agent into the hollow portion of the stem portion before subjecting the stem portion to a drawing process; and then subjecting the stem portion to the cold-drawing process.

* * * * *